(12) United States Patent
Park et al.

(10) Patent No.: US 9,129,755 B2
(45) Date of Patent: Sep. 8, 2015

(54) METHOD OF PREPARING POROUS METAL MATERIAL

(71) Applicant: Samsung Electronics Co., Ltd., Suwon-si (KR)

(72) Inventors: No-kyoung Park, Hwaseong-si (KR); Jae-hyun Hur, Yongin-si (KR); Kyu-hyun Im, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/055,300

(22) Filed: Oct. 16, 2013

(65) Prior Publication Data

US 2014/0104753 A1   Apr. 17, 2014

(30) Foreign Application Priority Data

Oct. 16, 2012 (KR) .................. 10-2012-0114760

(51) Int. Cl.
| | |
|---|---|
| *H01G 9/00* | (2006.01) |
| *H01G 11/30* | (2013.01) |
| *B01J 31/28* | (2006.01) |
| *H01G 11/86* | (2013.01) |
| *H01M 4/38* | (2006.01) |
| *B01J 31/06* | (2006.01) |
| *H01M 4/90* | (2006.01) |
| *H01M 4/92* | (2006.01) |
| *B01J 37/16* | (2006.01) |
| *B01J 37/32* | (2006.01) |
| *B01J 23/42* | (2006.01) |
| *B01J 23/44* | (2006.01) |
| *B01J 23/52* | (2006.01) |

(52) U.S. Cl.
CPC ............ *H01G 11/30* (2013.01); *B01J 31/063* (2013.01); *B01J 31/28* (2013.01); *H01G 11/86* (2013.01); *H01M 4/38* (2013.01); *B01J 23/42* (2013.01); *B01J 23/44* (2013.01); *B01J 23/52* (2013.01); *B01J 37/16* (2013.01); *B01J 37/32* (2013.01); *B01J 2231/70* (2013.01); *H01M 4/9041* (2013.01); *H01M 4/92* (2013.01); *Y02E 60/13* (2013.01)

(58) Field of Classification Search
CPC ....................................................... H01G 9/00
See application file for complete search history.

(56) References Cited

U.S. PATENT DOCUMENTS

| | | | |
|---|---|---|---|
| 7,579,151 B2 * | 8/2009 | Lee et al. ............... | 435/6.11 |
| 2009/0100969 A1 | 4/2009 | Rosi et al. | |
| 2011/0118441 A1 | 5/2011 | Gao | |
| 2012/0040581 A1 | 2/2012 | Kim | |

FOREIGN PATENT DOCUMENTS

| | | |
|---|---|---|
| KR | 10-2006-0111618 A | 10/2006 |
| KR | 10-2011-0065038 A | 6/2011 |

(Continued)

OTHER PUBLICATIONS

Um et al., "Enzyme-Catalysed Assembly of DNA Hydrogel," Oct. 2006, Nature Materials, vol. 5, pp. 797-801.

*Primary Examiner* — Seahvosh Nikmanesh
(74) *Attorney, Agent, or Firm* — Sughrue Mion, PLLC

(57) ABSTRACT

Provided is a method of preparing a porous metal material. The method includes: obtaining a composite of a DNA hydrogel and a metal precursor by mixing the DNA hydrogel and the metal precursor; and reducing the composite of the DNA hydrogel and the metal precursor.

17 Claims, 9 Drawing Sheets

(56) References Cited

FOREIGN PATENT DOCUMENTS

| KR | 10-2012-0063925 A | 6/2012 |
| KR | 10-1153620 B1 | 6/2012 |
| KR | 10-2012-0076202 A | 7/2012 |
| KR | 1020130129704 A | 11/2013 |

* cited by examiner

METHOD OF PREPARING POROUS METAL MATERIAL

CROSS-REFERENCE TO RELATED APPLICATIONS

This application claims the benefit of Korean Patent Application No. 10-2012-0114760, filed on Oct. 16, 2012, in the Korean Intellectual Property Office, the disclosure of which is incorporated herein in its entirety by reference.

BACKGROUND

1. Field

The present disclosure relates to a method of preparing a porous metal material, and more particularly, to a method of readily preparing various porous metal materials.

2. Description of the Related Art

Porous metal materials are often used as chemical or electrochemical catalysts or supercapacitors, or as electrode materials in batteries due to their large surface areas in addition to their original reactivity, and porous metal materials are being proposed to be used as new optical materials in the future. Metals generally work as catalysts in a chemical reaction, such as hydrogenation, or electrochemically oxidize polyalcohol and generate ethanol, and thus, metals may be used as catalysts of a fuel cell or as a material to be used in an energy storage device of a supercapacitor.

In the related art, pores are formed by inserting gas bubbles into a liquidified metal or a sintering method is used by heating powder-type metal particles to prepare a metal material having mesopores. However, in this case, reducing the size of pores is difficult, and preparing a porous material including two or more metals having different melting points is also difficult.

SUMMARY

Provided is a method of preparing various porous metal materials.

Provided is a porous metal material having mesopores and macropores.

Additional aspects will be set forth in part in the description which follows and, in part, will be apparent from the description, or may be learned by practice of the presented embodiments.

According to an aspect of an embodiment, a method of preparing a porous metal material includes obtaining a composite of a DNA hydrogel and a metal precursor by mixing the DNA hydrogel and the metal precursor; and reducing the composite of the DNA hydrogel and the metal precursor.

According to an aspect of another embodiment, a porous metal material that is prepared using the method above includes mesopores and macropores.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
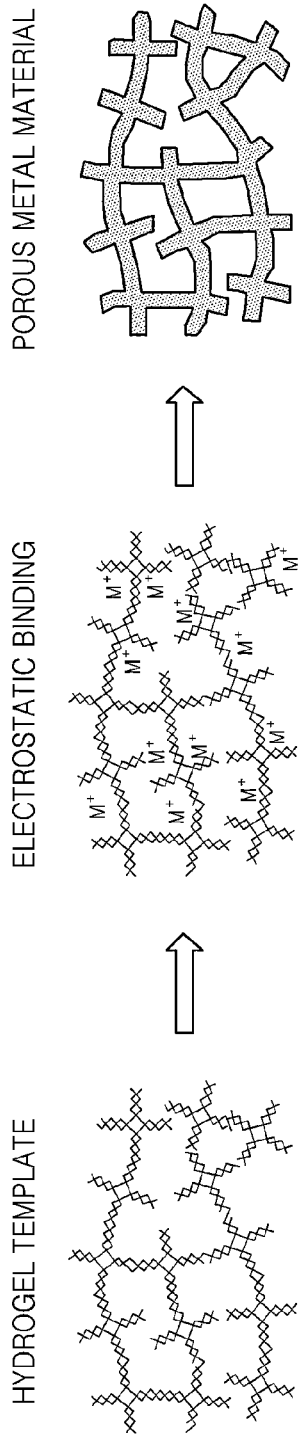
FIG. 1 is a schematic view illustrating preparation processes of a porous metal material according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

According to an aspect of an exemplary embodiment, a method of preparing a porous metal material includes obtaining a composite of a DNA hydrogel and a metal precursor by mixing the DNA hydrogel and the metal precursor; and reducing the composite of the DNA hydrogel and the metal precursor.

A metal material having a porous nanostructure is prepared with a DNA hydrogel as a template, wherein the DNA hydrogel is made using branched DNA as a building block. The metal material prepared in this manner has a porous structure that is almost the same as a structure of the DNA hydrogel.

Here, the term "DNA hydrogel" generally denotes branched DNAs bound in a 3-dimensional structure to form a gel.

In the method of preparing the porous metal material according to an embodiment, the DNA hydrogel may be formed by cross-linking at least one of X-DNA, Y-DNA, and T-DNA.

A size and shape of the DNA hydrogel may be exquisitely adjusted by controlling an initial concentration and type of the branched DNA. The DNA hydrogel has a thin plate shape, a leaf shape, or the like (a thickness of several to several hundreds of nm) and has a layered porous structure formed of mesopores and macropores. The DNA hydrogel has a negative charge due to phosphate of a DNA backbone.

The preparation of the DNA hydrogel includes preparing branched DNA by hybridizing single-stranded DNAs; and cross-linking the branched DNA.

The branched DNA is designed and synthesized so that each arm of the DNA molecule has a complementary sticky end. Here, the branched DNA may adjust a length of the arm as occasion demands. When the branched DNA prepared in this manner is cross-linked using an enzyme, such as T4 ligase, each of the branched DNA is cross-linked and forms a DNA hydrogel (DNA gel or also referred to as Dgel) of a 3-dimensional structure. The method of preparing the DNA hydrogel is disclosed in the publication "Enzyme-catalysed assembly of DNA hydrogel" (Nature Materials, Sep. 26, 2006, pp. 797-801) in detail, and this publication is incorporated herein in its entirety.

Any metal precursor that generates metal ions or metal complex ions in an aqueous solution may be used as the metal precursor used in the method of preparing the porous metal material according to an embodiment. For example, the metal precursor may be at least one selected from the group consisting of halides, nitrates, sulfates, carbonates, acetates, hydroxides, and hydrates. The metal precursor may include at least one type of metal ions or complex ions selected from the group consisting of gold, silver, palladium, platinum, copper, and nickel. In particular, the metal precursor may be one selected from the group consisting of $HAuCl_4$, $KAuCl_4$, $NaAuCl_4$, $NH_4AuCl_4$, $LiAuCl_4$, $KAuBr_4$, $NaAuBr_4$, $K_2PdCl_4$, $K_2PtCl_4$, $K_2PtCl_6$, $AgNO_3$, $H_2PtCl_6$, $H_2PtCl_4$, $AuCl$, $AuCl_3$, $NaAu(CN)_2$, and $KAu(CN)_2$.

A composite of the DNA hydrogel and the metal precursor may be obtained by mixing the DNA hydrogel and the metal precursor. Here, although not theoretically limited, the metal precursor may bind with the DNA hydrogel due to electrostatic attraction, intercalation, or base pairing. For example, when the metal precursor provides metal ions in an aqueous solution, the metal precursor binds with the DNA hydrogel due to electrostatic attraction with a negative charge of phosphate in the DNA hydrogel. Also, when the metal precursor provides metal complex ions in an aqueous solution, the metal precursor binds with the DNA hydrogel due to with a base of the DNA hydrogel or intercalation.

The metal material having a porous structure may be obtained by reducing the composite of the DNA hydrogel and the metal precursor. The method of reducing the metal precursor is not particularly limited. For example, a reducing agent may be added to the composite of the DNA hydrogen and the metal precursor to reduce the metal precursor to a metal, and thus a porous metal material where the metal is placed on the DNA hydrogel may be obtained. Examples of the reducing agent may be $NaBH_4$, $HCHO$, $NaOH$, $Na_2CO_3$, $CH_3OH$, $C_6H_8O_7$, or $Na_3C_6H_5O_7$. The porous metal material obtained in this manner may have the same frame structure as that of the DNA hydrogel, and thus a porous metal material having both macropores and mesopores may be conveniently obtained, and a porous metal material may be obtained by using various metals that may bind to a DNA hydrogel.

Figure 2:
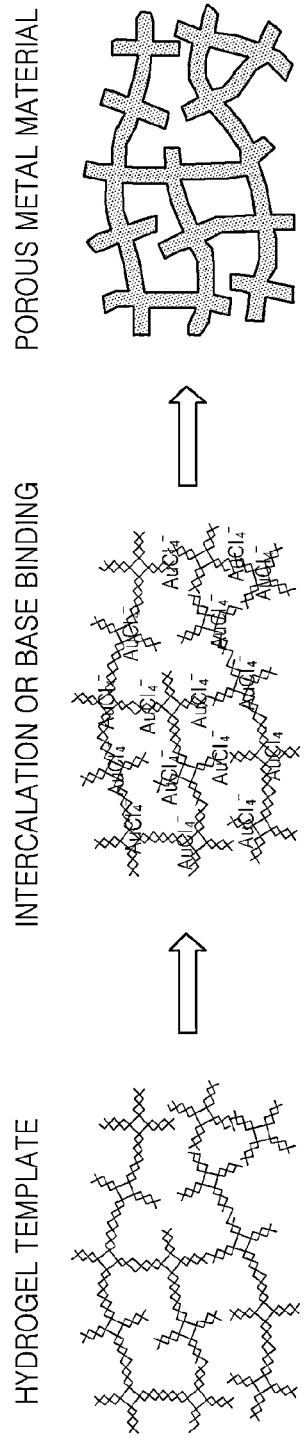
FIG. 2 is a schematic view illustrating preparation processes of a porous metal material according to another embodiment.
Figure 3:
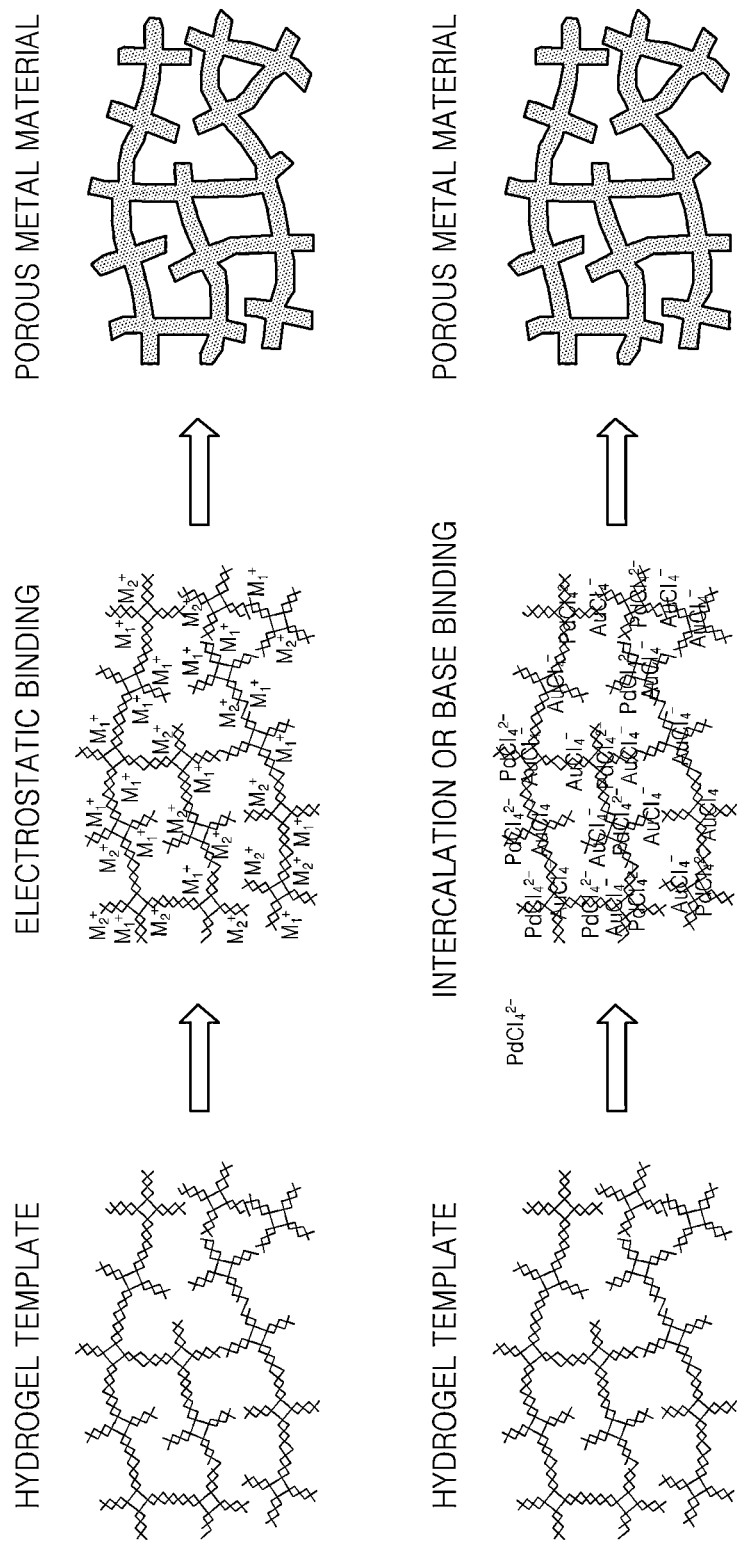
FIG. 3 is a schematic view illustrating preparation processes of a porous metal material according to embodiments.

FIGS. 1 to 3 are schematic views illustrating a preparation process of a porous metal material according to embodiments.

Referring to FIG. 1, the DNA hydrogel having a negative charge is bound to metal ions $M^+$ having a positive charge due to electrostatic attraction to form a composite. When a reducing agent is added to the composite, the metal ions are reduced, and a porous metal material having almost the same shape as that of the DNA hydrogel may be obtained. Referring to FIG. 2, metal complex ions bind between a base pair of the DNA hydrogel, and when the bound composite is reduced, a porous metal material may be obtained as well.

Referring to FIG. 3, when two different metal precursors including the metal ions or the metal complex ions having a positive charge are added, two different metal ions $M_1^+$ and $M_2^+$ or metal complex ions (e.g., $AuCl_4^-$ and $PdCl_4^{2-}$) are bound to the DNA hydrogel by electrostatic attraction, intercalation, or base pairing, and when a reducing agent is added, a porous metal material in which two or more metals exist as an alloy or a mixture may be obtained.

In the method of preparing the porous metal material according to an embodiment, the metal precursor may be used at an amount of 0.5 to 10 molecules with respect to one base pair of DNA forming the DNA hydrogel. When a number of the molecules is within the range above, a metal material having a porous structure may be effectively prepared.

According to an embodiment, the method of preparing the porous metal material may further include rinsing the composite of the DNA hydrogel and the metal precursor before reducing. A metal precursor that is not bound to the DNA hydrogel may be removed by the rinsing, and thus reduction of a non-specific metal precursor may be prevented.

The method of preparing the porous metal material according to an embodiment may be performed at room temperature, and thus the method may be cost effective and the porous metal material may be obtained using a simple and convenient method since the method does not require severe reaction conditions.

The porous metal material prepared using the method according to an embodiment may have mesopores with a size from about 5 nm to about 50 nm and macropores with a size from about 50 nm to about 100 μm.

The porous metal material according to an embodiment may be used as a chemical or electrochemical catalyst since a specific surface area of the metal is increased due to the existence of the macropores and the mesopores. In addition, the porous metal material may be used to form an electrode of a battery or may be applied as a new photonic material.

According to another aspect of an embodiment, an electrode includes a current collector; and an electrode active material formed on the current collector, wherein the electrode active material includes the porous metal material.

According to another aspect of an embodiment, a supercapacitor includes a cathode; an anode; and an electrolyte existing between the cathode and the anode, where at least one of the cathode and the anode may be the electrode.

The supercapacitor according to an embodiment may further include a separator. The cathode may be an electrode according to an embodiment. The anode may be the same as or different from the cathode. Any anode that is known in the field of the art may be used as the anode.

The electrolyte placed between the cathode and the anode may be used by being dissolved in a solvent. The solvent used for the electrolyte may be at least one selected from the group consisting of acetonitril, dimethylketone, and propylenecarbonate. The electrolyte has a solubility of 0.01 mole/L with respect to the solvent and is electrically inactive within a driving voltage range of the supercapacitor.

The electrolyte may be at least one selected from the group consisting of $H_2SO_4$, $Na_2SO_4$, $Li_2SO_4$, $LiPF_6$, lithiumperchlorate, lithiumtetrafluoroborate, KCl, KOH, and 1-ethyl-3-methylimidazoliumbis(trifluoromethylsulfonyl)imide ([EMIM][TFSI]).

The separator separates an inner space of the supercapacitor into a cathode and an anode and may be disposed between the cathode and the anode to prevent a short-circuit of the electrodes. Here, the separator may be formed of polypropylene, polyethylene, Teflon, or the like, but is not limited thereto.

Embodiments will be described in further detail with reference to the following examples. These examples are for illustrative purposes only and are not intended to limit the scope of the embodiments.

EXAMPLE 1

Preparation of DNA Hydrogel

X-type branched DNA was obtained by hybridizing single-stranded DNA. Here, a length of each arm of the X-type branched DNA was about 6 nm. 6 μl of 10× ligase buffer solution, 2 μl of water, and 2 μl of T4-ligase (3 unit/μl) were added to a 50 μl solution, in which 500 μg of the X-type branched DNA was dissolved, and mixed to make the total volume of 60 μl of the mixture, then the mixture was maintained at a temperature of 16° C. for 12 hours to obtain a DNA hydrogel.

Preparation of Porous Metal Material

The DNA hydrogel obtained above was freeze-dried at a temperature of −80° C. for 12 hours. Then, the DNA hydrogel was put into 100 μl of 15 mM chlorauric acid ($HAuCl_4$) solution and maintained for 12 hours or more to obtain a composite of the DNA hydrogel and gold chloride complex ions. The resultant was rinsed several times with distilled water. The composite of the DNA hydrogel and the gold chloride complex ions were put into 500 μl of distilled water, followed by adding 200 μl of 200 mM $NaBH_4$, to reduce a metal precursor. The resultant was rinsed several times with distilled water, and freeze-dried at a temperature of −80° C. for 12 hours to obtain a porous Au metal material.

Figure 4:
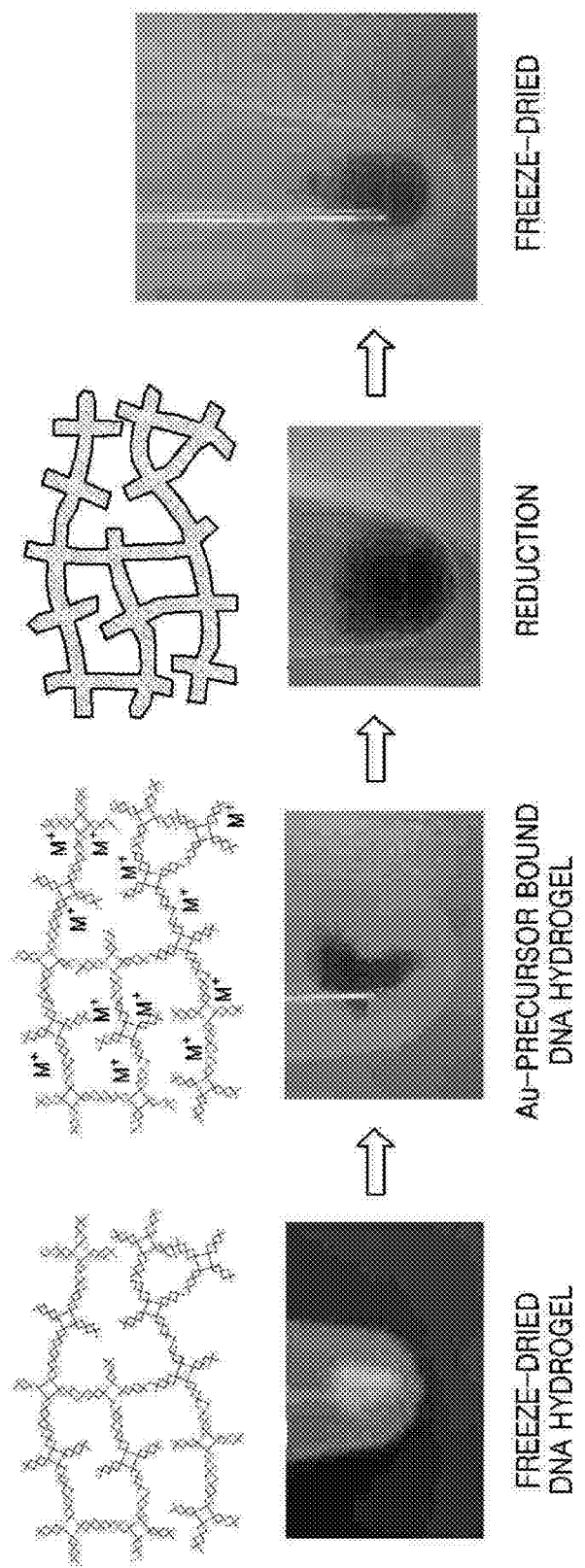
FIG. 4 shows stepwise views of a method of preparing a porous metal material prepared in Example 1.

FIG. 4 shows stepwise views of the method of preparing the porous metal material prepared in Example 1. As shown in FIG. 4, it may be confirmed that the composite of the DNA hydrogel and the metal precursor and the porous metal material were sequentially formed in each step while maintaining the same frame structure as that of the DNA hydrogel.

Figure 5A:
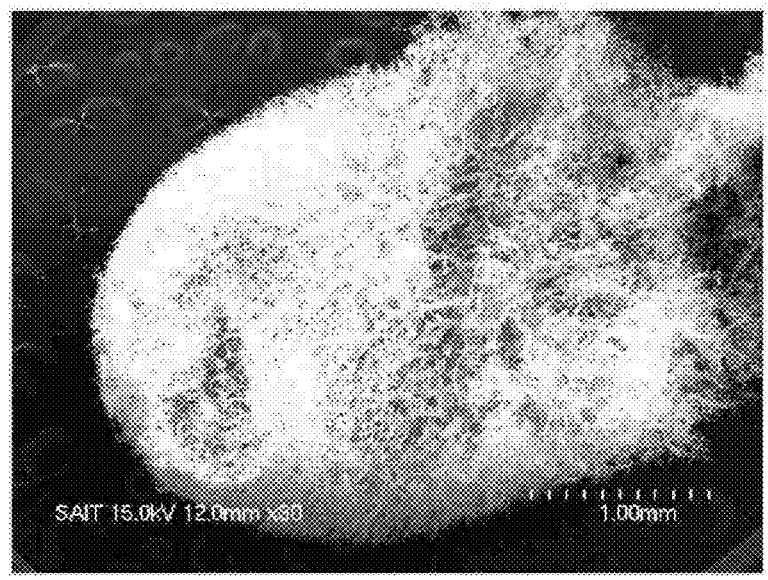
FIG. 5A is a 30× scanning electron microscope (SEM) image of the porous metal material prepared in Example 1.
Figure 5B:
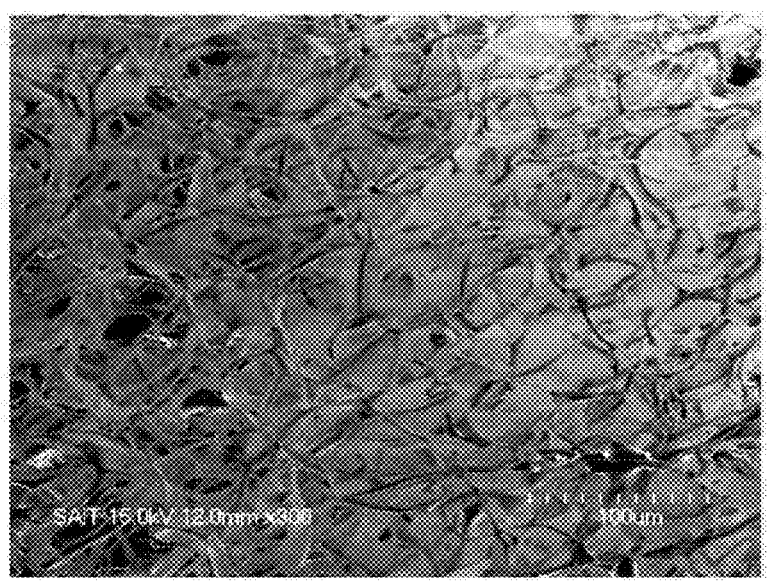
FIG. 5B is a 300×SEM image of the porous metal material prepared in Example 1.
Figure 5C:
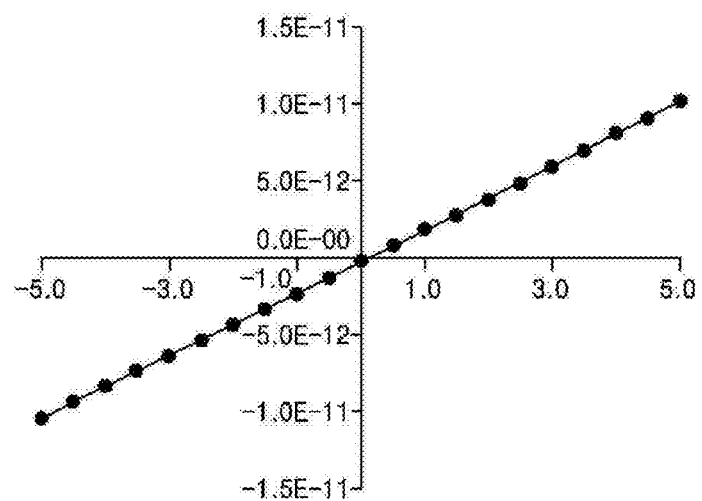
FIG. 5C is a graph showing conductivity of a prepared porous Au structure.

FIG. 5A is a 30× scanning electron microscope (SEM) image of the porous metal material prepared in Example 1. FIG. 5B is a 300×SEM image of the porous metal material prepared in Example 1. FIG. 5C is a graph showing conductivity of the prepared porous Au structure. As shown in FIGS. 5A and 5B, it may be confirmed that the metal material prepared in the method according to an embodiment has a porous structure. Also, as shown in FIG. 5C, the porous structure has conductivity.

Figure 6:
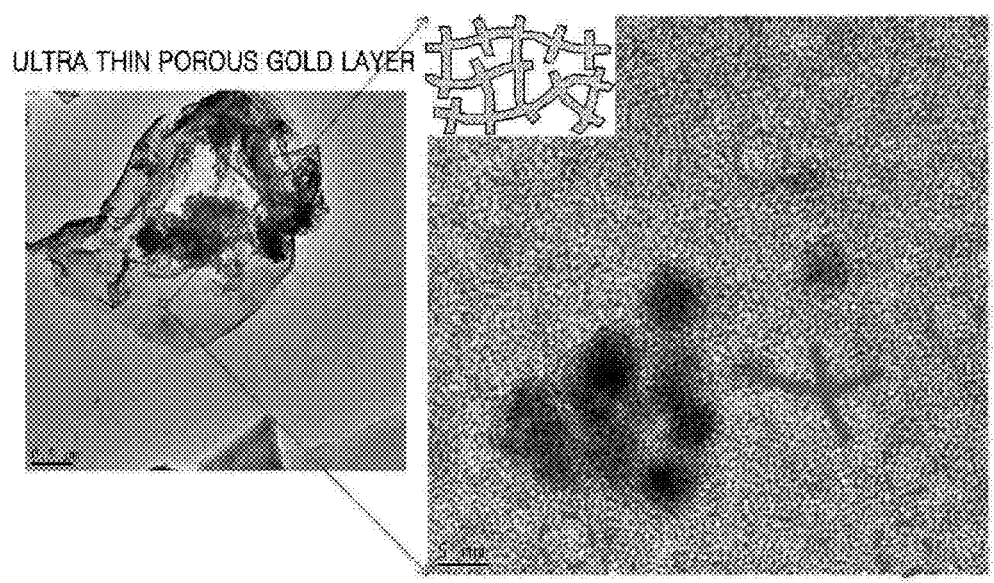
FIG. 6 is a transmission electron microscopy (TEM) image of the porous metal material prepared in Example 1.

FIG. 6 is a transmission electron microscopy (TEM) image of the porous metal material prepared in Example 1. As shown in FIG. 6, mesopores were observed.

Figure 7:
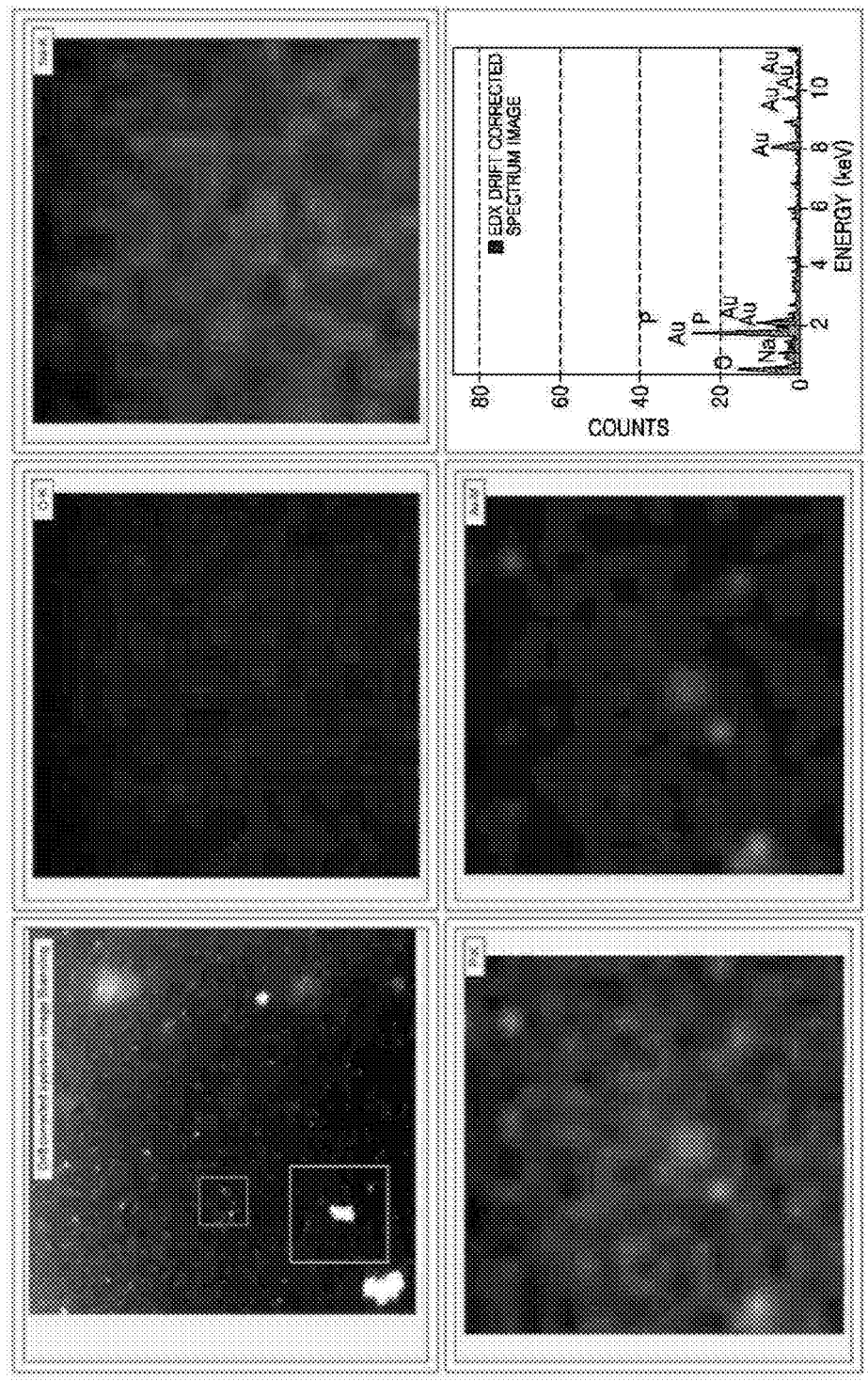
FIG. 7 is an image showing results of energy dispersive spectroscopy (EDS) mapping of the porous metal material prepared in Example 1.

FIG. 7 is an image showing the results of energy dispersive spectroscopy (EDS) mapping of the porous metal material prepared in Example 1. As shown in FIG. 7, the metal is well formed along the structure of the DNA hydrogel.

An electrochemical oxidation reaction of glycerol was performed as follows to confirm activity of the porous metal material prepared according to an embodiment as a catalyst.

A predetermined amount of the porous Au structure (in this case, 300 μg of the porous Au structure) that is dispersed in an aqueous solution was put on a surface of a rotating disc electrode (RDE) and dried. In this manner, an electrochemical activity of the porous Au structure was measured by having the RDE, on which the porous Au structure was placed, act as a working electrode in a glycerol solution. The glycerol solution had a final concentration of 1.0 M glycerol in 1.0 M KOH. The electrochemical activity was measured using cyclic voltammetry, and a voltage scan range was from about 0 V to about 1.4 V.

Figure 8:
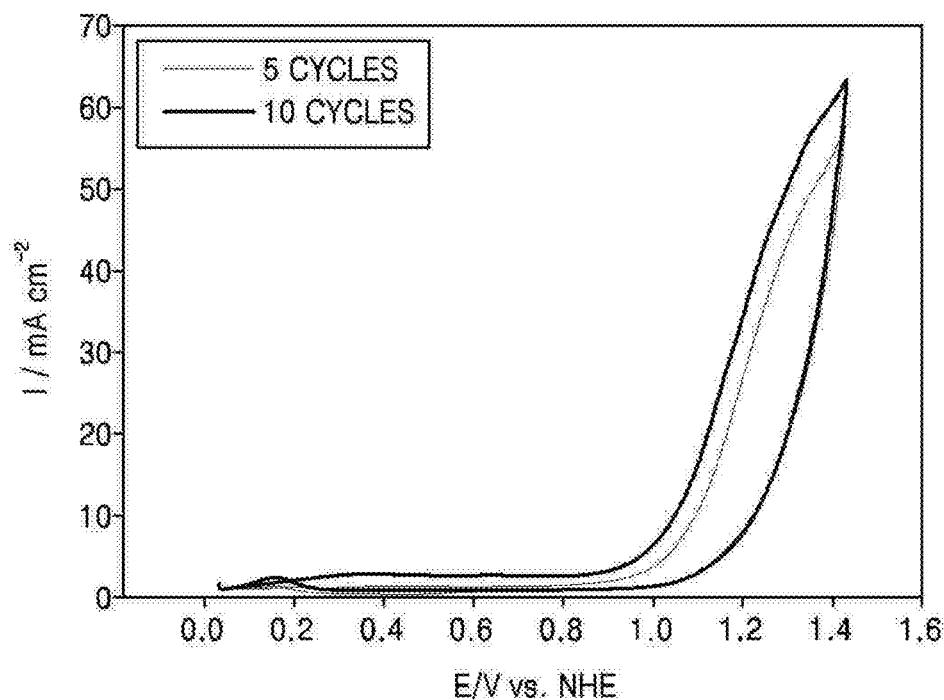
FIG. 8 is a graph showing electrochemical properties of the porous metal material prepared in Example 1.

FIG. 8 is a graph showing a cyclic voltammogram. As shown in FIG. 8, it may be confirmed that the porous metal material prepared by the method according to an embodiment may serve as a catalyst in the electrochemical oxidation reaction of glycerol.

EXAMPLE 2

A porous metal material was obtained in the same manner as in Example 1, except that a Pt precursor $K_2PtCl_4$ was used instead of $HAuCl_4$. Here, a range of an amount of the Pt precursor used was the same as that of the Au precursor.

Figure 9A:
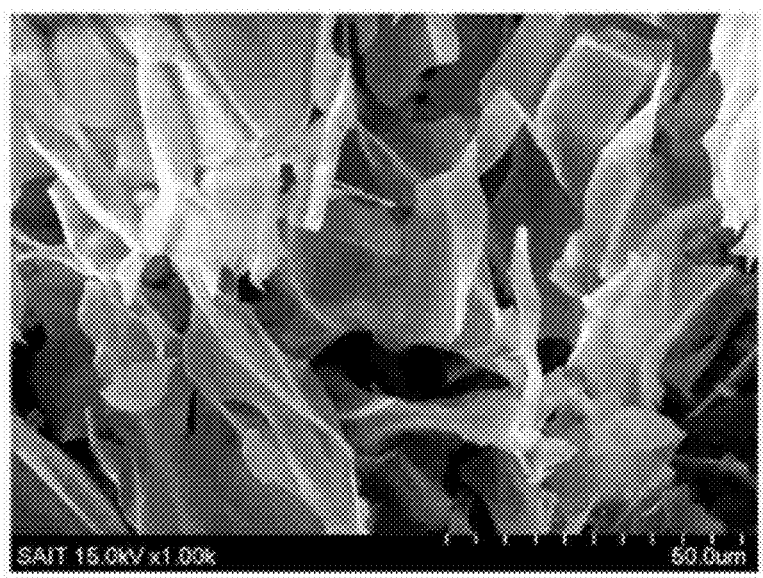
FIGS. 9A and 9B are an SEM image and an EDS mapping graph of a porous metal material prepared in Example 2.
Figure 9B:
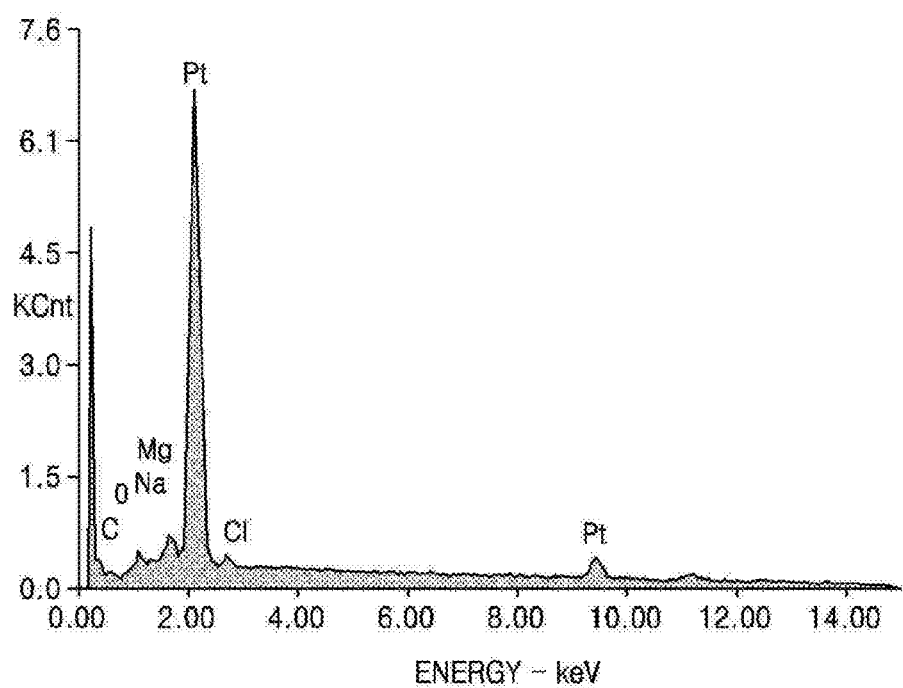

FIG. 9A is an SEM image of the porous metal material prepared in Example 2. FIG. 9B is a graph showing the results of EDS mapping of the porous metal material prepared in Example 2.

As shown in FIGS. 9A and 9B, it may be confirmed that the porous metal material having mesopores and macropores is well formed.

EXAMPLE 3

A porous metal material was obtained in the same manner as in Example 1, except that a Pd precursor $K_2PdCl_4$ was used instead of $HAuCl_4$. Here, a range of an amount of the Pd precursor used was the same as that of the Au precursor.

Figure 10A:
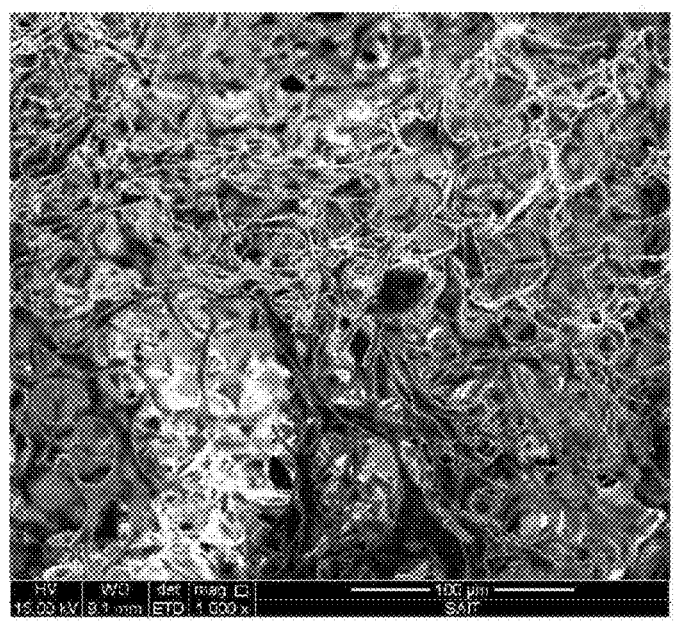
FIGS. 10A and 10B are an SEM image and an EDS mapping graph of a porous metal material prepared in Example 3.
Figure 10B:
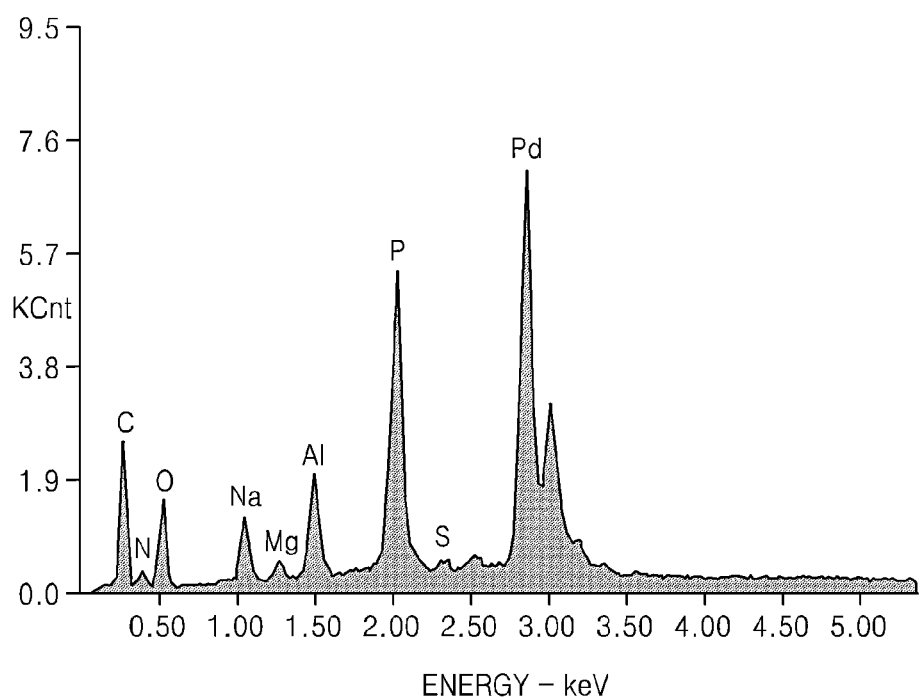

FIG. 10A is an SEM image of the porous metal material prepared in Example 3. FIG. 10B is a graph showing the results of EDS mapping of the porous metal material prepared in Example 3.

As shown in FIGS. 10A and 10B, it may be confirmed that the porous metal material having mesopores and macropores is well formed.

As described above, various types of porous metals may be readily prepared by using a method of preparing the porous metal material according to one or more of the above embodiments.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A method of preparing a porous metal material, the method comprising:
    obtaining a composite of a DNA hydrogel and a metal precursor by mixing the DNA hydrogel and the metal precursor; and
    reducing the composite of the DNA hydrogel and the metal precursor.

2. The method of claim 1, wherein the DNA hydrogel is prepared by cross-linking at least one of X-DNA, Y-DNA, and T-DNA.

3. The method of claim 1, wherein the metal precursor forms metal ions or metal complex ions in an aqueous solution.

4. The method of claim 1, wherein the metal precursor comprises at least one metal selected from the group consisting of gold, silver, copper, palladium, and platinum.

5. The method of claim 1, wherein the metal precursor is at least one selected from the group consisting of $HAuCl_4$, $KAuCl_4$, $NaAuCl_4$, $NH_4AuCl_4$, $LiAuCl_4$, $KAuBr_4$, $NaAuBr_4$, $K_2PdCl_4$, $K_2PtCl_4$, $K_2PtCl_6$, $AgNO_3$, $H_2PtCl_6$, $H_2PtCl_4$, $AuCl$, $AuCl_3$, $NaAu(CN)_2$, and $KAu(CN)_2$.

6. The method of claim 1, wherein the metal precursor is mixed at an amount of 0.5 to 10 molecules with respect to one base pair of DNA that form the DNA hydrogel.

7. The method of claim 1, wherein the reducing of the metal precursor bound to the DNA hydrogel further comprises treating the metal precursor with a reducing agent.

8. The method of claim 7, wherein the reducing agent is $NaBH_4$, HCHO, NaOH, $Na_2CO_3$, $CH_3OH$, $C_6H_8O_7$, or $Na_3C_6H_5O_7$.

9. The method of claim 1, wherein the DNA hydrogel is prepared by:
preparing branched DNA by hybridizing single-stranded DNA; and
cross-linking the branched DNA.

10. The method of claim 9, wherein the branched DNA is cross-linked by a DNA ligase.

11. The method of claim 1 further comprising rinsing the composite of the DNA hydrogel and metal precursor before the reducing of the composite of the DNA hydrogel and metal precursor.

12. A porous metal material prepared using the method of claim 1, wherein the porous metal material comprises mesopores and macropores.

13. The porous metal material of claim 12, wherein a diameter of the mesopores is from about 5 nm to about 50 nm.

14. The porous metal material of claim 12, wherein a diameter of the macropores is from about 50 nm to about 100 um.

15. A catalyst comprising the porous metal material of claim 12.

16. An electrode comprising the porous metal material of claim 12.

17. A supercapacitor comprising the porous metal material of claim 12.

* * * * *